(12) United States Patent
Lee et al.

(10) Patent No.: US 11,585,913 B2
(45) Date of Patent: Feb. 21, 2023

(54) ULTRA-WIDEBAND-BASED SYSTEM AND METHOD FOR DETECTING PROPERTIES ASSOCIATED WITH A MOVABLE OBJECT IN AN ENVIRONMENT

(71) Applicant: Logistics and Supply Chain MultiTech R&D Centre Limited, Pok Fu Lam (HK)

(72) Inventors: Kin Keung Lee, Pok Fu Lam (HK); Edward James Jackson, Pok Fu Lam (HK); Ka Lun Fan, Pok Fu Lam (HK)

(73) Assignee: Logistics and Supply Chain Multi Tech R&D Centre Limited, Pok Fu Lam (HK)

( * ) Notice: Subject to any disclaimer, the term of this patent is extended or adjusted under 35 U.S.C. 154(b) by 1021 days.

(21) Appl. No.: 16/295,110

(22) Filed: Mar. 7, 2019

(65) Prior Publication Data
US 2020/0284892 A1    Sep. 10, 2020

(51) Int. Cl.
| | |
|---|---|
| *G01S 13/02* | (2006.01) |
| *H01Q 5/25* | (2015.01) |
| *H04W 8/00* | (2009.01) |
| *H04B 17/318* | (2015.01) |
| *G01S 13/56* | (2006.01) |
| *G01S 13/62* | (2006.01) |

(52) U.S. Cl.
CPC .......... *G01S 13/0209* (2013.01); *G01S 13/56* (2013.01); *G01S 13/62* (2013.01); *H01Q 5/25* (2015.01); *H04B 17/318* (2015.01); *H04W 8/005* (2013.01)

(58) Field of Classification Search
CPC ...... G01S 13/0209; G01S 13/88; G01S 13/56; G01S 7/415; G01S 13/04; G01S 7/417; G01S 7/411; G01S 13/003; G01S 13/08; G01S 7/412; G01S 13/62; G01S 13/887; G01S 7/414; G01S 13/878; H01Q 5/25; H04B 17/318; H04B 17/27; A61B 5/7264; H04W 8/005
See application file for complete search history.

(56) References Cited

U.S. PATENT DOCUMENTS

| | | | |
|---|---|---|---|
| 7,567,200 B1 * | 7/2009 | Osterweil | G01S 13/56 342/28 |
| 7,916,066 B1 * | 3/2011 | Osterweil | A61B 5/1117 382/115 |
| 2014/0125510 A1 * | 5/2014 | Li | G01S 13/50 342/28 |

(Continued)

FOREIGN PATENT DOCUMENTS

| | | | | |
|---|---|---|---|---|
| WO | WO-2017139432 A1 * | 8/2017 | | G01C 21/005 |

*Primary Examiner* — Olumide Ajibade Akonai
(74) *Attorney, Agent, or Firm* — Renner, Kenner, Greive, Bobak, Taylor & Weber

(57) ABSTRACT

An ultra-wideband-based system and method for detecting properties associated with a movable object in an environment such as an indoor environment. The method includes transmitting ultra-wideband radar signals to an environment, using an ultra-wideband transmitter, and receiving signals reflected from the environment as a result of the transmission of the first ultra-wideband radar signals using an ultra-wideband receiver. The method also includes processing the reflected signals and determining properties associated with a movable object in an environment based on the processed reflected signals, using the processor.

25 Claims, 5 Drawing Sheets

(56) References Cited

U.S. PATENT DOCUMENTS

| | | | |
|---|---|---|---|
| 2018/0313950 A1* | 11/2018 | Mohamadi | G01S 13/0209 |
| 2018/0353138 A1* | 12/2018 | Doheny | A61B 5/1121 |
| 2019/0259270 A1* | 8/2019 | Amini | H04W 52/0245 |
| 2019/0377063 A1* | 12/2019 | Cho | G01S 13/50 |
| 2021/0275056 A1* | 9/2021 | McMahon | A61B 5/6887 |

* cited by examiner

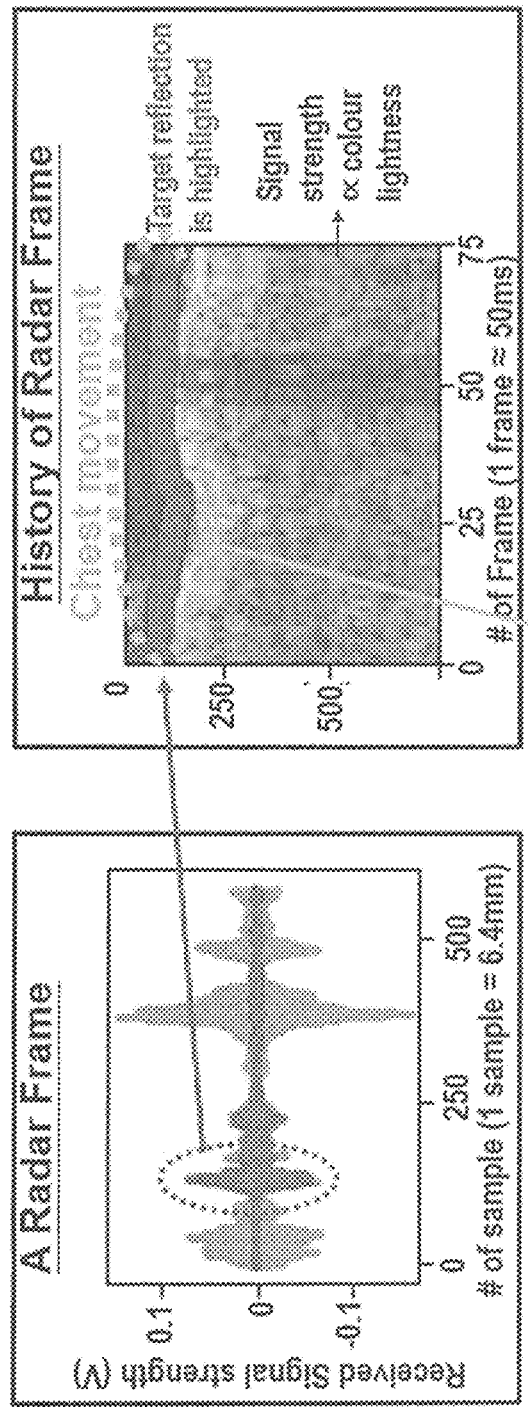
Figure 4A
Figure 4B
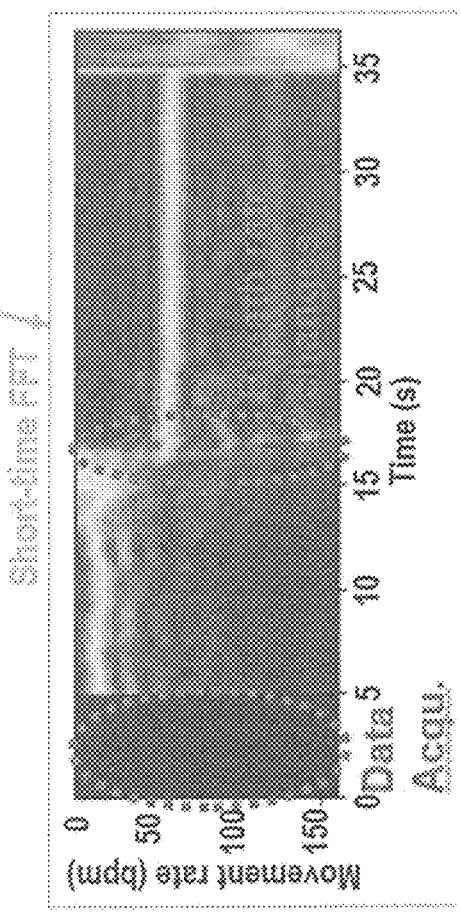
Figure 4C

ULTRA-WIDEBAND-BASED SYSTEM AND METHOD FOR DETECTING PROPERTIES ASSOCIATED WITH A MOVABLE OBJECT IN AN ENVIRONMENT

TECHNICAL FIELD

The invention relates to systems and methods that use ultra-wideband radar signals for detecting properties associated with a movable object in an environment.

BACKGROUND

Systems and methods for detecting location of an object are known. One type of systems and methods uses automatic image-processing of data captured by video cameras. This type generally requires large computing power to proper operate, and in some cases, poses privacy concern. Another type of systems and methods are based on tag-and-anchor, i.e., a wearable device (tag) carried by the target object and suitable for transmitting location information to base stations (anchors) using, e.g., RFID or other near field technologies. For the tag-and-anchor type to work, the target object must be wearing or carrying the wearable device at the time of measurement. Trivial as this may seem, remembering to wear or carry the device may not be easy for target objects such as elderlies or dementia patients.

SUMMARY OF THE INVENTION

It is an object of the invention to address the above needs, to overcome or substantially ameliorate the above disadvantages or, more generally, to provide alternative or improved systems and methods for detecting properties associated with a movable object in an environment.

In accordance with a first aspect of the invention, there is provided an ultra-wideband-based method for detecting properties associated with a movable object in an environment, comprising: transmitting, using a first ultra-wideband transmitter, a plurality of first ultra-wideband radar signals to an environment; receiving, using a first ultra-wideband receiver, a plurality of first signals reflected from the environment as a result of the transmission of the first ultra-wideband radar signals; processing, using a processor, the reflected first signals; and determining, using the processor, properties associated with a movable object in an environment based on the processed reflected first signals.

In one embodiment of the first aspect, the determination step comprises determining presence (or absence) of the movable object in the environment.

In one embodiment of the first aspect, the processing step comprises removing, from each of the reflected first signals, a reference background signal. The reference background signal may be predetermined (fixed). Alternatively, the reference background signal may be adjustable on the fly, e.g., based on the reflected first signals.

In one embodiment of the first aspect, the processing step comprises determining a respective difference between every two temporally-adjacent reflected first signals. This involves identifying the signal component(s) that has changed between adjacent frames of reflected first signals.

In one embodiment of the first aspect, the determination step comprises determining a distance between the movable object and the first ultra-wideband receiver based on the processed reflected first signals.

In one embodiment of the first aspect, the determination step further comprises determining a change in the distance between the movable object and the first ultra-wideband receiver. By determining a change in the distance, movement tendency of the movable object may be traced (towards or away from the receiver).

In one embodiment of the first aspect, the processing step further comprises analysing at least one of signal strength and frequency of the processed reflected first signals. Various signal processing techniques, e.g., domain transform, thresholding, filtering, scaling, etc., can be used in the analysis.

In one embodiment of the first aspect, the method further includes classifying the movable object as being in either an active state or an inactive state based on the analysis.

In one embodiment of the first aspect, the classification step comprises comparing the processed reflected first signals with a classification threshold. If the processed reflected first signals are determined to be above a classification threshold, then the object is considered to be in the active state. If the processed reflected first signals are determined to be below a classification threshold, then the object is considered to be in the inactive state. The object may be considered to be in either the active state or in the inactive state when the processed reflected first signals equal to the classification threshold. In some embodiments, multiple classification thresholds may be used, e.g., to better and more finely classify the object' level of activity.

In one embodiment of the first aspect, the classification threshold is dependent on a distance between the movable object and the first ultra-wideband receiver. For example, when the distance is determined to be within a first predetermined distance range, then a first classification threshold is used, and when the distance is determined to be within a second predetermined distance range (different from the first), then a second classification threshold is used (different from the first). In practice, each distance range may refer to a respective area in the environment, each area may have different settings and functions, which cause the object to have different level of activity.

In one embodiment of the first aspect, the method further includes adjusting the classification threshold based on signal strength of the processed reflected first signals.

In one embodiment of the first aspect, analysing frequency of the processed reflected first signals comprises: segmenting the processed reflected first signals to analyse only the parts of the processed reflected first signals determined to be associated with the movable object. This reduces computation power required for subsequent signal processing.

In one embodiment of the first aspect, analysing frequency of the processed reflected first signals comprises: analysing frequency of the processed reflected first signals may also include analysing change in frequency content of a series of processed reflected first signals.

In one embodiment of the first aspect, the movable object is a human or an animal, and the determination step further comprises determining a respiratory rate of the human or animal based on the frequency analysis.

In one embodiment of the first aspect, the method further includes transmitting, using a second ultra-wideband transmitter, a plurality of second ultra-wideband radar signals to an environment; receiving, using a second ultra-wideband receiver, a plurality of second signals reflected from the environment as a result of the transmission of the second ultra-wideband radar signals; and processing, using a processor, the reflected second signals. The determination of the properties associated with the movable object in the environment is further based on the processed reflected second signals.

In one embodiment of the first aspect, the processing of the reflected second signals comprises removing, from each of the reflected second signals, a reference background signal. The reference background signal may be predetermined (fixed). Alternatively, the reference background signal may be adjustable on the fly, e.g., based on the reflected second signals.

In one embodiment of the first aspect, the processing of the reflected second signals comprises determining a respective difference between every two temporally-adjacent reflected second signals. This involves identifying the signal component(s) that has changed between adjacent frames of reflected second signals.

In one embodiment of the first aspect, the determination step further comprises determining a distance between the movable object and the second ultra-wideband receiver based on the processed reflected second signals.

In one embodiment of the first aspect, the determination step further comprises determining a change in the distance between the movable object and the second ultra-wideband receiver. By determining a change in the distance, movement tendency of the movable object may be traced (towards or away from the receiver).

In one embodiment of the first aspect, the determination step further comprises determining a 2D location of the movable object in the environment based on the processed reflected first signals and the processed reflected second signals. For example, the 2D location can be determined based on the determined distance (or change in distance) between the movable object and the first ultra-wideband receiver, and the determined distance (or change in distance) between the movable object and the second ultra-wideband receiver, provided that the relative position or distance between the two ultra-wideband receivers are known.

In one embodiment of the first aspect, the determination step further comprises determining a change in the 2D location of the movable object in the environment. By determining a change in the 2D location, movement path of the movable object may be traced.

In one embodiment of the first aspect, the first ultra-wideband transmitter and the first ultra-wideband receiver are arranged in a single first ultra-wideband transceiver; the second ultra-wideband transmitter and the second ultra-wideband receiver are arranged in a single second ultra-wideband transceiver. The first and second ultra-wideband transceivers may each be a standalone unit and are operably connected with each other. Or the first and second ultra-wideband transceivers may be arranged in the same unit. The first and second ultra-wideband transceivers preferably can communicate with external electronic devices (computers, phones, tablets, servers, etc.) through a wired or wireless communication network.

In one embodiment of the first aspect, the environment is an indoor environment, for example, in a building; and the movable object is a human or an animal. In one example, the environment is the home of an elderly, and the movable object is an elderly. In another example, the environment is the ward of a hospital, and the movable object is a patient.

In accordance with a second aspect of the invention, there is provided an ultra-wideband-based system for detecting properties associated with a movable object in an environment. The ultra-wideband-based system may be implemented to perform the method of the first aspect. The ultra-wideband-based system includes: a first ultra-wideband transmitter for transmitting a plurality of first ultra-wideband radar signals to an environment; a first ultra-wideband receiver for receiving a plurality of first signals reflected from the environment as a result of the transmission of the first ultra-wideband radar signals; a processor for processing the reflected first signals and for determining properties associated with a movable object in an environment. The properties may include at least one of: presence of the movable object in the environment based on the processed reflected first signals; a distance between the movable object and the first ultra-wideband receiver; a change in the distance between the movable object and the first ultra-wideband receiver; and whether the movable object is in an active state or an inactive state.

In one embodiment of the second aspect, the ultra-wideband-based system further includes: a second ultra-wideband transmitter for transmitting a plurality of second ultra-wideband radar signals to an environment; and a second ultra-wideband receiver for receiving a plurality of second signals reflected from the environment as a result of the transmission of the second ultra-wideband radar signals. The one or more processors are arranged to process the reflected second signals. The one or more processors are further arranged to determine at least one of the following properties associated with the movable object in the environment based on the processing of one or both of the reflected first signals and the reflected second signals: presence of the movable object in the environment based on the processed reflected second signals; a distance between the movable object and the second ultra-wideband receiver; a change in the distance between the movable object and the second ultra-wideband receiver; a 2D location of the movable object in the environment; and a change in the 2D location of the movable object in the environment.

In one embodiment of the second aspect, the one or more processors, operably connected with each other, may be distributed among difference devices/units or integrated in the same device/unit.

In one embodiment of the second aspect, the first ultra-wideband transmitter and the first ultra-wideband receiver are arranged in a single first ultra-wideband transceiver; the second ultra-wideband transmitter and the second ultra-wideband receiver are arranged in a single second ultra-wideband transceiver. The first and second ultra-wideband transceivers may each be a standalone unit and are operably connected with each other. Or the first and second ultra-wideband transceivers may be arranged in the same unit. The first and second ultra-wideband transceivers preferably can communicate with external electronic devices (computers, phones, tablets, servers, etc.) through a wired or wireless communication network.

BRIEF DESCRIPTION OF THE DRAWINGS

Embodiments of the invention will now be described, by way of example, with reference to the accompanying drawings in which:

FIG. 4A is a graph showing a frame of signal received a result of the transmission of an ultra-wideband radar signal, also illustrating removal of background signal;

FIG. 4B is a graph showing profile of processed radar frames, also illustrating detection of a target (e.g., movable object);

FIG. 4C is a graph showing frequency relationship of the profile in FIG. 4B.

DETAILED DESCRIPTION

Figure 1:
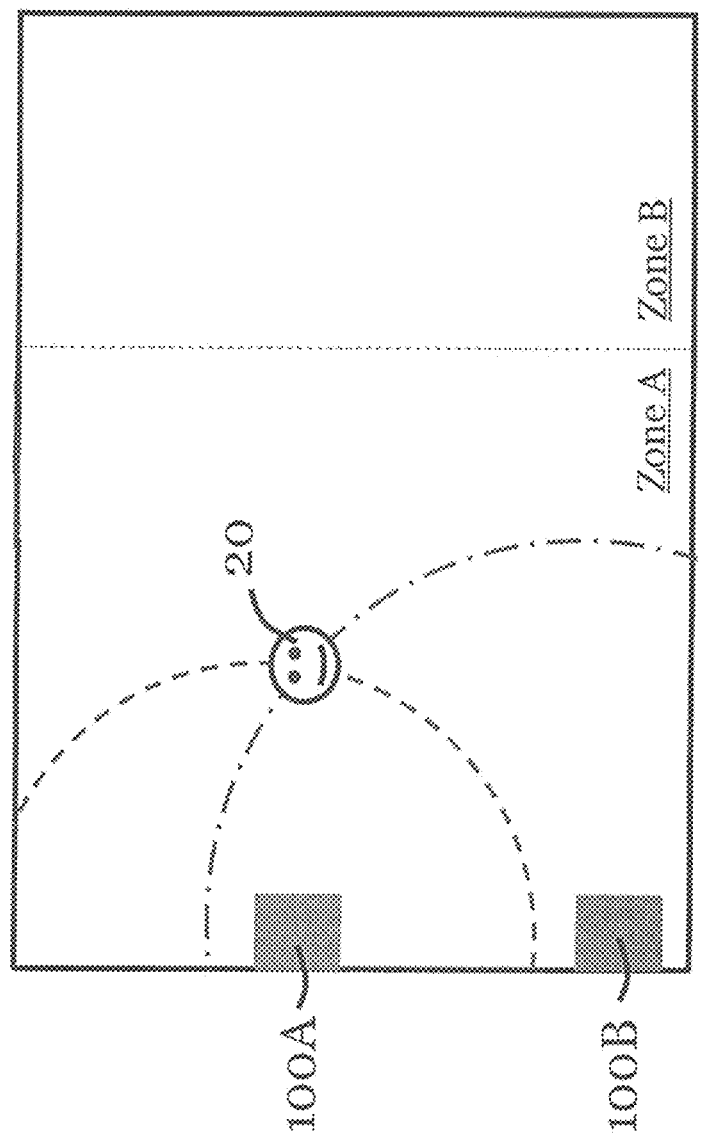
FIG. 1 is an illustration of an environment implementing an ultra-wideband-based detection system in one embodiment of the invention.

FIG. 1 shows an environment 10 installed with an ultra-wideband-based detection system in one embodiment of the invention. In this embodiment, the environment 10 is an indoor environment, in the form of a room in a building. A movable object 20, for example, an individual, is in the room 10. The ultra-wideband-based detection system includes two ultra-wideband units 100A, 100B, each with respective ultra-wideband transmitter(s) for transmitting ultra-wideband radar signals and respective receiver(s) for receiving signals reflected from the environment 10. The ultra-wideband-based detection system is operable to determine properties of the movable object 20 in the environment 10.

Figure 2:
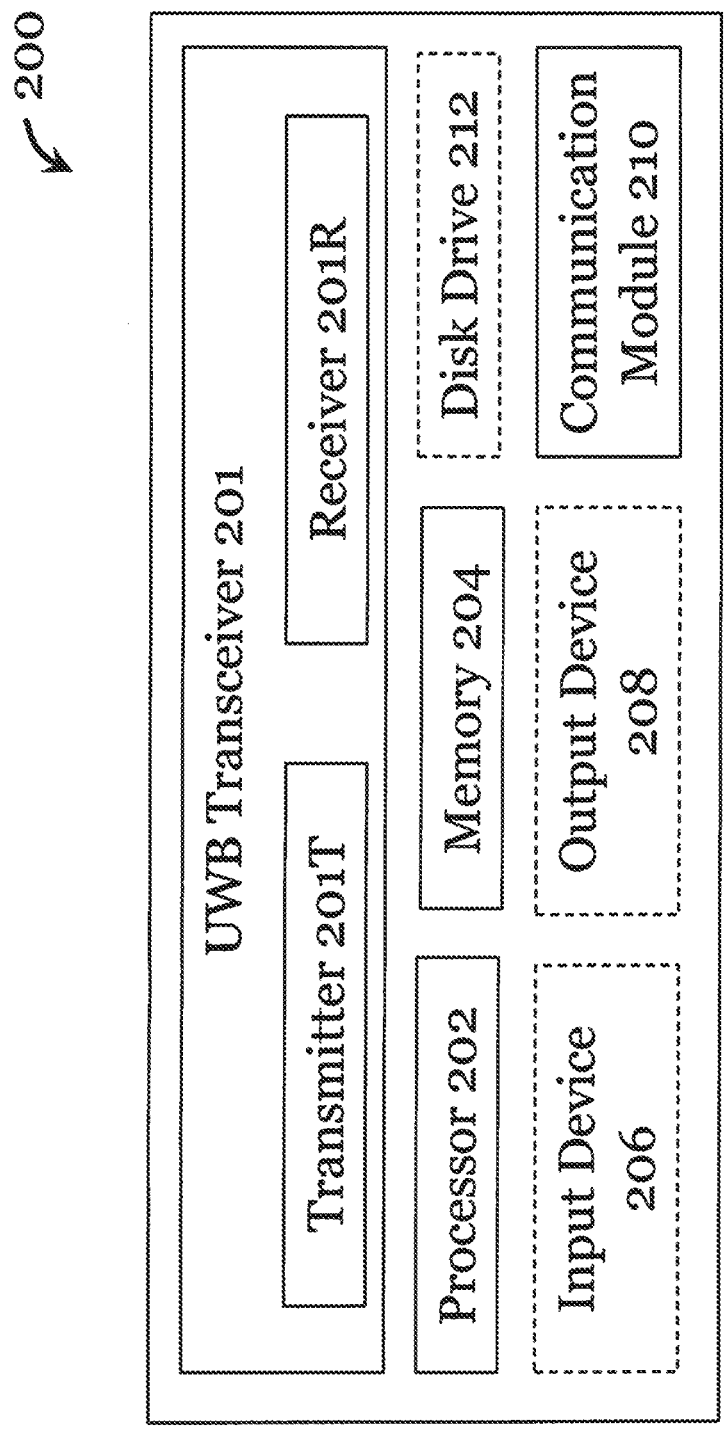
FIG. 2 is a functional block diagram of an ultra-wideband unit in the ultra-wideband-based detection system of FIG. 1 in one embodiment of the invention.

FIG. 2 is a block diagram of the main components of an ultra-wideband-based unit 200 in one embodiment of the invention. Each of the ultra-wideband units 100A, 100B in FIG. 1 may have the same basic construction of the unit 200 of FIG. 2. The unit 200 may have different configurations, and it may be implemented in a single device or distributively in multiple operably connected devices. The unit 200 generally includes suitable components necessary to receive, store, and execute appropriate computer instructions, commands, or codes. In this embodiment, the main components of the unit 200 include a UWB transceiver 201 with a transmitter 201T and a receiver 201R. The transmitter 201T and receiver 201R may be the same part or they may be distinct parts. The unit 200 also includes a processor 202 and a memory 204. The processor 202 may be formed by one or more CPU, MCU, controllers, logic circuits, Raspberry Pi chip, etc. The memory 204 may include one or more volatile memory unit (such as RAM, DRAM, SRAM), one or more non-volatile memory unit (such as ROM, PROM, EPROM, EEPROM, FRAM, MRAM, FLASH, SSD, NAND, and NVDIMM), or any of their combinations. The unit 200 may further include one or more input devices 206 such as a keyboard, a mouse, a stylus, an image scanner, a microphone, a tactile input device (e.g., touch sensitive screen), and an image/video input device (e.g., camera). The unit 200 may further include one or more output devices 208 such as one or more displays (e.g., monitor), speakers, disk drives, headphones, earphones, printers, 3D printers, etc. The display may include a LCD display, a LED/OLED display, or any other suitable display that may or may not be touch sensitive. The unit 200 may further include one or more disk drives 212 which may encompass solid state drives, hard disk drives, optical drives, flash drives, and/or magnetic tape drives. A suitable operating system may be installed in the unit 200, e.g., on the disk drive 212 or in the memory 204. The components of the unit 200 may be operated by the processor 202. The unit 200 also includes a communication module 210 for establishing one or more communication links (not shown) with one or more other external computing devices such as servers, personal computers, terminals, tablets, phones, or other wireless or handheld computing devices. The communication module 210 may also establish communication links between different units 200 to enable communication between units 200. The communication module 210 may be a modem, a Network Interface Card (NIC), an integrated network interface, a radio frequency transceiver, an optical port, an infrared port, a USB connection, or other wired or wireless communication interfaces. The communication links may be wired or wireless for communicating commands, instructions, information and/or data. The transceiver 201, the processor 202, the memory 204, the input device(s) 206, the output device(s) 208, the communication module 210 and the disk drives 212 are connected with each other through a bus, a Peripheral Component Interconnect (PCI) such as PCI Express, a Universal Serial Bus (USB), an optical bus, or other like data and/or power bus. Although not illustrated, the unit 200 may be powered by DC power source (e.g., battery cells, battery packs) or AC power source (e.g., with power cord and plug for connection to AC mains socket). The unit 200 may be further connected with one or more external data storage or server, through the communication module 210.

A person skilled in the art would appreciate that the unit 200 shown in FIG. 2 is merely exemplary. For example, the number of transceivers 201 in a unit may be more than one. The transmitter 201T and receiver 201R may be arranged separately, not as a single transceiver 201. In one example, when multiple units 200 are operably connected with each other (e.g., as in FIG. 1), one of the units 200 may be the master unit and the other unit(s) 200 may be slave unit(s) controlled by the master unit. The processor of the master unit may control operation of the processor of the slave unit(s), while data and signal processing may be carried out on any of the processors. In some embodiments, the transmitter 201T and receiver 201R, or the transceiver 201, may be arranged separately from the other components of the unit 200.

Figure 3:
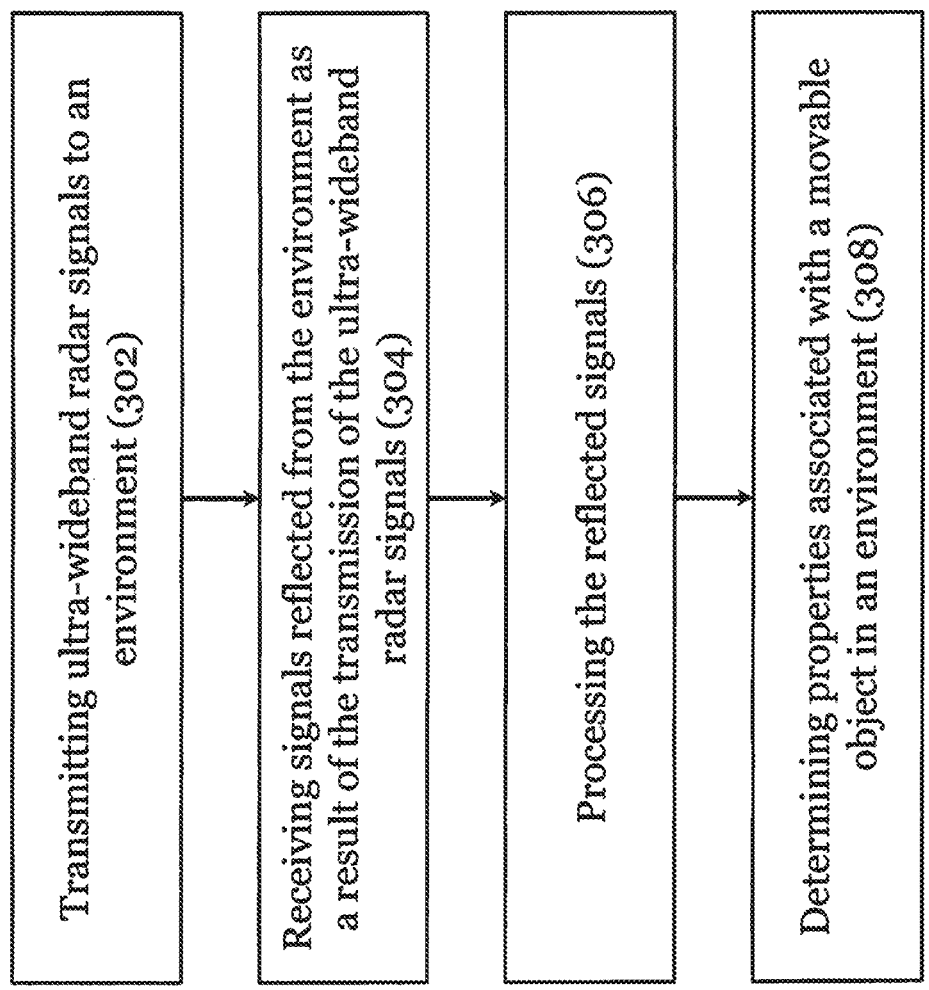
FIG. 3 is a flow diagram of a method for detecting properties associated with a movable object in an environment using the ultra-wideband-based detection system in FIG. 1.

FIG. 3 shows a method 300 for detecting properties associated with the object 20 in the environment 10 using the ultra-wideband-based detection system in FIG. 1 in one embodiment of the invention.

The method 300 begins in step 302, in which ultra-wideband radar signals are transmitted to the environment 10. In one embodiment, the transmission may be performed by the ultra-wideband transmitter of only one of the units 100A, 100B. In another embodiment, the transmission may be performed by the ultra-wideband transmitters of both units 100A, 100B. The transmission by the two units 100A, 100B may be performed substantially simultaneously, or may be performed one after the other (with a known time difference), controlled by the processor of one or both units 100A, 100B.

The method 300 then proceeds to step 304, in which signals reflected from the environment 10 as a result of the transmission of the ultra-wideband radar signals are received. In the embodiment in which transmission is performed by the ultra-wideband transmitter of only one of the units 100A, 100B, the receiver of the corresponding unit would receive the reflected signal. In the embodiment in which transmission is performed by the ultra-wideband transmitter of both units 100A, 100B, the receiver of both units 100A, 100B would receive respective reflected signals. The reflected signals contain information about the environment 10, including the object 20 in the environment 10.

Subsequently, in step 306, the reflected signals are analysed. The determination may be performed by the processor of the unit 100A, 100B that receives the reflected signals, or by any other processor operably connected with the units 100A, 100B. In the embodiment in which transmission and receive are performed by only one of the units 100A, 100B, the processor of the corresponding unit would analyse the received reflected signal. In the embodiment in which transmission is performed by the ultra-wideband transmitter of both units 100A, 100B, the processor of both units 100A, 100B would process the respectively received reflected signals. The processing may include removing, from each of the reflected signals, a reference background signal. The reference background signal may be predetermined (fixed), or it may be adjusted on the fly based on the properties (strength, frequency, phase, etc.) of the reflected signals. Alternatively or additionally, the processing may include identifying the signal component(s) that has changed between adjacent frames of reflected signals to determine a respective difference between every two temporally-adjacent reflected first signals. A temporal profile can be built up as more and more reflected signals are processed. The processing also involves analysing signal strength or frequency (or both) of the processed (e.g., background-removed) reflected first signals using, e.g., frequency-time-domain transform, thresholding (e.g., variable based on the noise in the signal), filtering, scaling, time gain compensation, etc. In one example, analysing frequency of the processed reflected signals involve segmenting the processed reflected first signals to analyse only the parts of the processed reflected first signals determined to be associated with the movable object.

Upon processing the received signals, in step 308, the properties associated with the movable object 20 in the environment 10 are determined. The determination may be performed by the processor of the units 100A, 100B that performs the processing step in step 306, or by any other processor operably connected with the units 100A, 100B.

The properties associated with the movable object 20 in the environment 10 may be a presence (or absence) of the movable object 20 in the environment 10. This may be determined based on the processed signals. If the processed signals contain no temporally varying signal components then the object 20 is considered to be absent in the environment 10. In one embodiment (even if the processed signals contain temporally varying signal components), the processed signals is compared with predetermined reference signal to determine whether the object 20 is present or absent in the environment 10. The determination of the presence (or absence) of the movable object 20 can be performed using only one unit 100A, 100B.

The properties associated with the movable object 20 in the environment 10 may be a distance between the movable object 20 and one of the units 100A, 100B. This may be determined based on the processed signals, based on time of flight or like techniques. The determination of the distance can be performed by only one unit 100A, 100B (so only one distance determined) or using both units 100A, 100B (respective distances determined). By monitoring the temporal change in the processed signals, the change in distance between the movable object 20 and any one of the units 100A, 100B can also be determined.

In one embodiment in which both units 100A, 100B both determine a respective distance (or respective change in distance), the properties associated with the movable object 20 in the environment 10 may be a 2D location of the object 20 in the environment 10. The 2D location can be determined based on the determined distance (or change in distance) between the movable object 20 and the unit 100A and the determined distance (or change in distance) between the movable object 20 and the unit 100B, provided that the relative position or distance between the two ultra-wideband receivers of the units 100A, 100B are known. By monitoring the temporal change in the processed signals, the change in 2D location of the movable object 20 in the environment 10 can be determined and hence a movement path of the object 20 can be traced.

In one embodiment in which the movable object is a human or animal, the properties associated with the movable object 20 in the environment 10 may be a respiratory rate of the human or animal. The respiratory rate may be determined based on frequency analysis of the processed received signals.

The method 300, with steps 306 and 308, may be to classify whether the object 20 is in an active state (e.g., exercising) or in an inactive state (e.g., sleeping). The classification may involve comparing the processed reflected signals with a classification threshold. If the processed reflected first signals are determined to be above a classification threshold, then the object 20 is considered to be in the active state. If the processed reflected first signals are determined to be below a classification threshold, then the object 20 is considered to be in the inactive state. In some embodiments, multiple classification thresholds may be used, e.g., to better and more finely classify the object' level of activity. In one implementation, the classification threshold is different for different range of distances between the movable object and units 100A, 100B. For example, when the distance is determined to be 0 m to 80 m (e.g., zone A in FIG. 1), a first classification threshold is used, and when the distance is determined to be 80 m to 100 m (e.g., zone B in FIG. 1), a second classification threshold different from the first is used. Different zones may represent different areas (e.g., bedroom, bathroom, kitchen, etc., which the object 20 would carry out different types of activities. The determination of active and inactive state may also take into account the respiratory rate of the object (based on the strength of the respiratory rate signal).

FIG. 4A is a graph illustrating a frame of signal received a result of the transmission of an ultra-wideband radar signal, and removal of background signal, in one embodiment of the invention. As shown in FIG. 4A, the signal frame contains a background signal and a signal that indicates condition of or in the environment 10. The signal frame is processed by removing the background signal from the signal frame, and optionally applying other signal processing or reconstruction techniques. By doing so, the resulting processed signal would be a "movement signal" that indicates change in the condition of or in the environment 10 (e.g., properties of object 20).

FIG. 4B is a graph illustrating profile of processed radar frames, and detection of a target (e.g., movable object) based on the profile. FIG. 4B can be obtained by aggregating radar frames like those of FIG. 4A and plotting them all in a single graph. In FIG. 4B, the thick line circled by a dotted line shows the identified change in distance between the object 20 and the unit 100A or 100B.

FIG. 4C is a graph illustrating frequency relationship of part of the signal profile in the graph of FIG. 4B. FIG. 4C can be obtained, e.g., by performing short time Fast Fourier Transform to the portion of the profile circuit by the dotted line. The graph in FIG. 4C shows change in the extracted movement signal (movement rate) over time and time. Signals forming this graph can be analyse and processed to extract the respiratory rate, and the strength of the signals can be used to set activity level thresholds for the system (e.g., as described above).

Figure 5:
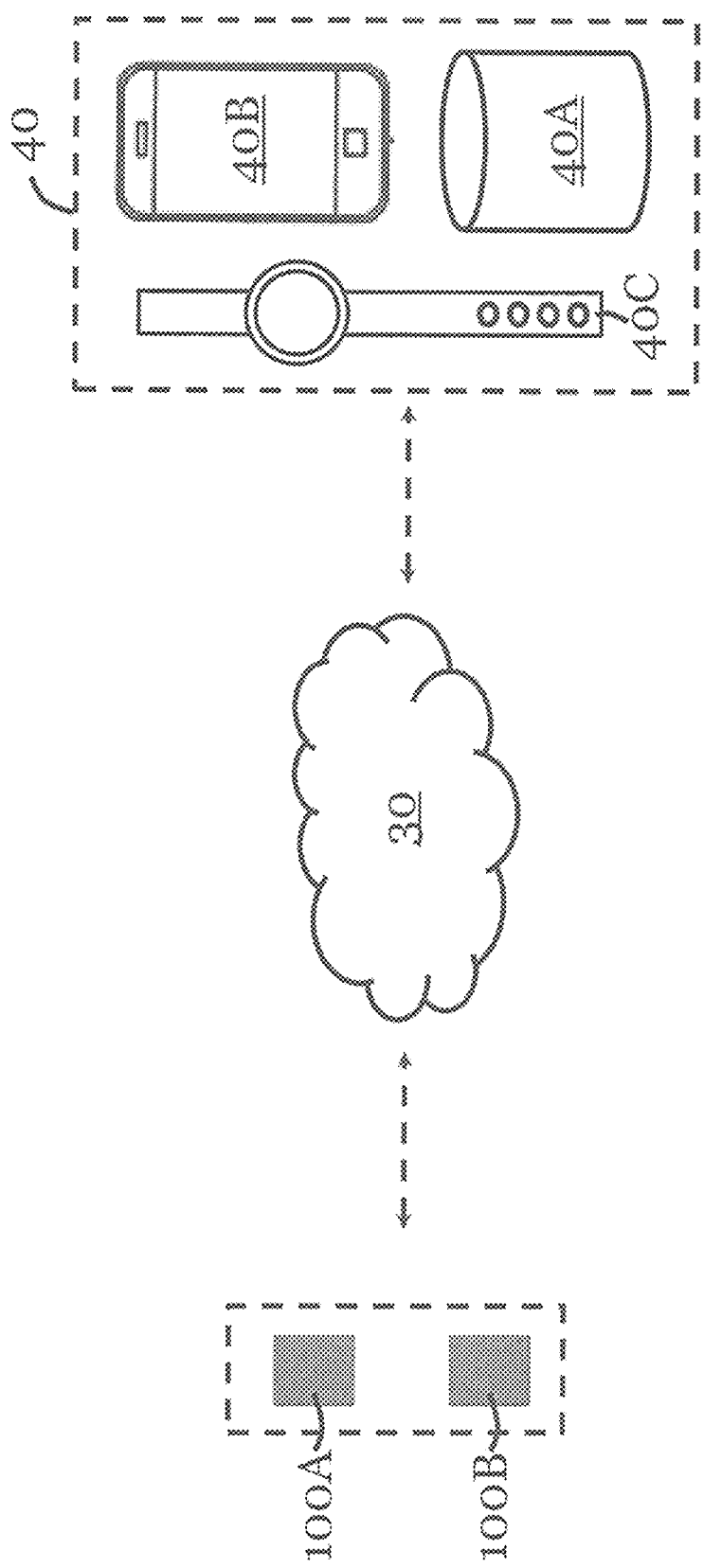
FIG. 5 is an illustration of a system including the ultra-wideband-based detection system of FIG. 1 in one embodiment of the invention.

FIG. 5 is an illustration of a system including the ultra-wideband-based detection system of FIG. 1 in one embodiment of the invention. As shown in FIG. 5, the units 100A, 100B are operably connected with one or more external electronic devices through a communication network 30. The communication network 30 can be wired or wireless (more preferred). The external electronic devices 40 may be in the form of a computer server 40A, a smart phone/tablet 40B, or a smart watch 40C. The basic construction of the external electronic devices 40 are known and it includes, generally, processor, memory, I/O devices, communication module, disk drive, etc. (e.g., similar to those described with respect to FIG. 2). The system allows the unit 100A, 100B to send data, alert, information to the external electronic devices 40 for view, analysis, storage, etc. In one example, if it is determined that the activity level of the object 20 suddenly becomes, which may indicate collapse of the object 20, the units 100A, 100B can send an alert to the external electronic devices 40 to notify the user or manager of the external electronic devices 40 of such event and take emergency action.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include any appropriate arrangement of computer or information processing hardware capable of implementing the function described.

It will be appreciated by persons skilled in the art that numerous variations and/or modifications may be made to the invention as shown in the specific embodiments without departing from the spirit or scope of the invention as broadly described. For example, the ultra-wideband-based system 100 may be formed by a single unit or more than 2 units, different from that illustrated in FIG. 1. The system 100 may be formed by multiple ultra-wideband-based transmitter-receiver pairs/transceivers, operably connected with a single standalone computing device (notebook computer, desktop computer, etc.). The invention may be applied to outdoor environment. The movable object may be an animal instead. The invention may be applied in environments where multiple objects (not only one as illustrated) are in. The described embodiments of the invention should therefore be considered in all respects as illustrative, not restrictive.

The invention claimed is:

1. An ultra-wideband-based method for detecting properties associated with a movable object in an environment, comprising:

transmitting, using a first ultra-wideband transmitter, a plurality of first ultra-wideband radar signals to an environment;

receiving, using a first ultra-wideband receiver, a plurality of first signals reflected from the environment as a result of the transmission of the first ultra-wideband radar signals;

processing, using a processor, the reflected first signals; and determining, using the processor, properties associated with a movable object in the environment based on the processed reflected first signals;

wherein the processing step comprises:

analysing at least one of signal strength and frequency of the processed reflected first signals; and classifying the movable object as being in either an active state or an inactive state by comparing the processed reflected first signals with one of classification thresholds that are different for a different range of distances between the movable object and the ultra-wideband transmitter;

wherein the classification thresholds represent different zones in the environment, in which the movable object carries out different types of activities.

2. The method of claim 1, wherein the determination determining step comprises determining presence of the movable object in the environment.

3. The method of claim 1, wherein the processing step comprises removing, from each of the reflected first signals, a reference background signal.

4. The method of claim 1, wherein the processing step comprises determining a respective difference between every two temporally-adjacent reflected first signals.

5. The method of claim 1, wherein the determining step comprises determining a distance between the movable object and the first ultra-wideband receiver.

6. The method of claim 5, wherein the determination determining step further comprises determining a change in the distance between the movable object and the first ultra-wideband receiver.

7. The method of claim 1, wherein the classification threshold is dependent on a distance between the movable object and the first ultra-wideband receiver.

8. The method of claim 7, further comprising adjusting the classification threshold based on signal strength of the processed reflected first signals.

9. The method of claim 1, wherein analysing frequency of the processed reflected first signals comprises:

segmenting the processed reflected first signals to analyse only the parts of the processed reflected first signals determined to be associated with the movable object.

10. The method of claim 1, wherein the movable object is a human or an animal, and wherein the determining step further comprises determining a respiratory rate of the human or animal based on the frequency analysis.

11. The method of claim 1, further comprising:

transmitting, using a second ultra-wideband transmitter, a plurality of second ultra-wideband radar signals to an environment;

receiving, using a second ultra-wideband receiver, a plurality of second signals reflected from the environment as a result of the transmission of the second ultra-wideband radar signals; and processing, using a processor, the reflected second signals, wherein the determining step is further based on the processed reflected second signals.

12. The method of claim 11, wherein the processing of the reflected second signals comprises removing, from each of the reflected second signals, a reference background signal.

13. The method of claim 11, wherein the processing of the reflected second signals comprises determining a respective difference between every two temporally-adjacent reflected second signals.

14. The method of claim 11, wherein the determining step further comprises determining a distance between the movable object and the second ultra-wideband receiver based on the processed reflected second signals.

15. The method of claim 14, wherein the determining step further comprises determining a change in the distance between the movable object and the second ultra-wideband receiver.

16. The method of claim 14, wherein the determining step further comprises determining a 2D location of the movable object in the environment based on the processed reflected first signals and the processed reflected second signals.

17. The method of claim 16, wherein the determining step further comprises determining a change in the 2D location of the movable object in the environment.

18. The method of claim 11, wherein the second ultra-wideband transmitter and the second ultra-wideband receiver are arranged in a single ultra-wideband transceiver.

19. The method of claim 1, wherein the first ultra-wideband transmitter and the first ultra-wideband receiver are arranged in a single ultra-wideband transceiver.

20. The method of claim 1, wherein the environment is an indoor environment.

21. The method of claim 1, wherein the movable object is a human or an animal.

22. An ultra-wideband-based system for detecting properties associated with a movable object in an environment, comprising:
   a first ultra-wideband transmitter for transmitting a plurality of first ultra-wideband radar signals to an environment;
   a first ultra-wideband receiver for receiving a plurality of first signals reflected from the environment as a result of the transmission of the first ultra-wideband radar signals;
   one or more processors for processing the reflected first signals and for determining properties associated with a movable object in the environment, wherein the properties are:
   presence of the movable object in the environment based on the processed reflected first signals;
   a distance between the movable object and the first ultra-wideband receiver;
   a change in the distance between the movable object and the first ultra-wideband receiver; and
   whether the movable object is in an active state or an inactive state, by comparing the processed reflected first signals with one of classification thresholds that are different for a different range of distances between the movable object and the ultra-wideband transmitter, wherein the classification thresholds represent different zones in the environment, in which the movable object carries out different types of activities.

23. The ultra-wideband-based system of claim 22, wherein the first ultra-wideband transmitter and the first ultra-wideband receiver are arranged in a single ultra-wideband transceiver.

24. The ultra-wideband-based system of claim 22, further comprising:
   a second ultra-wideband transmitter for transmitting a plurality of second ultra-wideband radar signals to an environment; and
   a second ultra-wideband receiver for receiving a plurality of second signals reflected from the environment as a result of the transmission of the second ultra-wideband radar signals;
   wherein the one or more processors are arranged to process the reflected second signals;
   wherein the one or more processors are further arranged to determine at least one of the following properties associated with the movable object in the environment based on the processing of one or both of the reflected first signals and the reflected second signals:
   presence of the movable object in the environment based on the processed reflected second signals;
   a distance between the movable object and the second ultra-wideband receiver;
   a change in the distance between the movable object and the second ultra-wideband receiver;
   a 2D location of the movable object in the environment; and
   a change in the 2D location of the movable object in the environment.

25. The ultra-wideband-based system of claim 24, wherein the second ultra-wideband transmitter and the second ultra-wideband receiver are arranged in a single ultra-wideband transceiver.

* * * * *